United States Patent
Abe et al.

(10) Patent No.: US 7,781,357 B2
(45) Date of Patent: Aug. 24, 2010

(54) DIELECTRIC CERAMIC COMPOSITION

(75) Inventors: Masaru Abe, Nikaho (JP); Kakeru Watanabe, Yurihonjo (JP); Ryohei Nakano, Kamakura (JP); Yasuo Niwa, Yurihonjo (JP); Matsumi Watanabe, Yurihonjo (JP)

(73) Assignee: TDK Corporation, Tokyo (JP)

( * ) Notice: Subject to any disclaimer, the term of this patent is extended or adjusted under 35 U.S.C. 154(b) by 145 days.

(21) Appl. No.: 12/232,876

(22) Filed: Sep. 25, 2008

(65) Prior Publication Data

US 2009/0088314 A1  Apr. 2, 2009

(30) Foreign Application Priority Data

Sep. 28, 2007  (JP)  ............... 2007-255586

(51) Int. Cl.
C04B 35/20  (2006.01)
C04B 35/465  (2006.01)

(52) U.S. Cl. ...................... 501/122; 501/136
(58) Field of Classification Search ................. 501/122, 501/136
See application file for complete search history.

(56) References Cited

U.S. PATENT DOCUMENTS

| 7,351,674 B2 | 4/2008 | Mori et al. | |
| 7,358,207 B2* | 4/2008 | Tamura et al. | 501/136 |
| 7,417,001 B2* | 8/2008 | Mori et al. | 501/32 |
| 7,439,202 B2* | 10/2008 | Mori et al. | 501/134 |

FOREIGN PATENT DOCUMENTS

| JP | 44-24448 | * | 10/1969 |
| JP | 47021697 | * | 10/1972 |
| JP | 47021698 | * | 10/1972 |
| JP | A 1-275465 | | 11/1989 |
| JP | A-2000-344571 | | 12/2000 |
| JP | A 2002-068829 | | 3/2002 |
| JP | A 2002-338345 | | 11/2002 |
| JP | A-2004-131320 | | 4/2004 |
| JP | 2005335986 | * | 12/2005 |
| JP | 2006026762 | * | 3/2006 |
| JP | 2006056762 | * | 3/2006 |
| JP | 2006335633 | * | 12/2006 |
| WO | WO 2005/082806 A1 | | 9/2005 |

OTHER PUBLICATIONS

Japanese Office Action issued in corresponding Japanese Application No. 2007-255586, mailed Dec. 15, 2009. (with English-language translation).

* cited by examiner

*Primary Examiner*—Karl E Group
(74) *Attorney, Agent, or Firm*—Oliff & Berridge, PLC

(57) ABSTRACT

A dielectric ceramic composition comprising forsterite in an amount of 93.0 to 99.0 mol % when calculating in terms of $2MgO.SiO_2$ and calcium titanate in an amount of 1.0 to 7.0 mol % when calculating in terms of $CaTiO_3$ as main components, and as a subcomponent, aluminum oxide in an amount of 0.2 to 5 mass % when calculating in terms of $Al_2O_3$ per 100 mass % of said main components. According to the present invention, a dielectric ceramic composition, capable of having both low permittivity and good frequency-temperature characteristic as well as ensuring high Qf value and further having sufficient mechanical strength, and suitable to use in an antenna, a filter and the like used in the high-frequency region, can be provided. Also, the present invention allows providing a dielectric ceramic composition further having resistance to reduction in addition to all of the above properties.

6 Claims, 3 Drawing Sheets

Sample 9 (no Al$_2$O$_3$ added)

5 μm

Sample 6 (Al$_2$O$_3$ : 2.0wt%)

5 μm

DIELECTRIC CERAMIC COMPOSITION

FIELD OF THE INVENTION

The present invention relates to a dielectric ceramic composition, and further particularly a dielectric ceramic composition suitable to use in an element for an antenna or an element for a filter such as bandpass filter, used in the high-frequency region.

DESCRIPTION OF THE RELATED ART

Recently, with the rapid developments of information-communication technology, a range of frequencies used is expanding to the high-frequency region. As a result, to efficiently use the limited frequency range, it is required to segmentalize the frequencies and to speed up transmission speed, etc. A dielectric ceramic composition, used as an electronic component mounted in a communication device such as a mobile phone, is no exception to this.

Such a dielectric ceramic composition needs to increase a Qf value calculated as a product of a quality factor "Q" and the frequency in use "f" (i.e. high-frequency property); to have low permittivity to prevent delaying transmission of signals (i.e. speeding up); and to reduce temperature coefficient "$\tau f$" of resonance frequency for segmentation of the frequencies (i.e. high reliability).

However, forsterite and alumina, for example, are low in permittivity and allow obtaining favorable Qf values, but are unable to reduce temperature coefficient $\tau f$, so that there is a need for a material providing all of these properties.

The Japanese Unexamined Patent Publication 2004-131320 describes that a dielectric ceramic composition comprising specific content rates of forsterite, zinc titanate and calcium titanate can result in specific permittivity of 8 to 20, increased Qf value, and frequency-temperature coefficient $\tau f$ of 30 ppm/° C. or lower.

Also, the Japanese Unexamined Patent Publication 2000-344571 describes that a dielectric ceramic composition comprising specific content rates of forsterite, calcium titanate and spinel can result in permittivity-temperature coefficient "$\tau \in$" in the range of −100 ppm/° C. or higher to 50 ppm/° C. or lower.

However, according to the Japanese Unexamined Patent Publication 2004-131320, when the specific permittivity is 8 or lower, it is unable to attain good frequency-temperature coefficient $\tau f$. Also, in the Japanese Unexamined Patent Publication 2000-344571, only permittivity-temperature coefficient $\tau \in$ is evaluated, but there is no disclosure in frequency-temperature coefficient $\tau f$.

Since such a dielectric ceramic composition is subject to being mounted in a communication device such as mobile communication, it is impossible to attain commercialization of product without a certain level of mechanical strength. Also, the dielectric ceramic composition is insufficient in resistance to reduction, so that there is a problem that base metal such as Cu, which is inexpensive but necessary to fire in a reducing atmosphere, cannot be applied as a conducting electrode.

SUMMARY OF THE INVENTION

The present invention, made in view of this situation, has a purpose to provide a dielectric ceramic composition, capable of having both low permittivity and good frequency-temperature characteristic as well as ensuring high Qf value and further having sufficient mechanical strength, and suitable to use in an antenna, a filter and the like used in the high-frequency region. Also, another purpose of the present invention is to provide a dielectric ceramic composition further having resistance to reduction in addition to all of the above properties.

To attain the above purposes, a dielectric ceramic composition according to the present invention comprises as main components, forsterite in an amount of 93.0 to 99.0 mol % when calculating in terms of $2MgO.SiO_2$ and calcium titanate in an amount of 1.0 to 7.0 mol % when calculating in terms of $CaTiO_3$ and as a subcomponent, aluminum oxide in an amount of 0.2 to 5 mass % when calculating in terms of $Al_2O_3$ per 100 mass % of said main components.

This allows the dielectric ceramic composition to attain low permittivity and high Qf value as well as good frequency-temperature coefficient $\tau f$ which tends to deteriorate as lowering permittivity. In addition, because of improved mechanical strength, the dielectric ceramic composition according to the present invention is excellent in handling ability even when using it, for example, as an antenna element or an element for a bandpass filter, for a communication device such as a mobile phone, so that it is easy to mount in a communication device.

Preferably, cobalt oxide is further included as a subcomponent in an amount of 0.1 to 1.2 mass % when calculating in terms of $Co_3O_4$ per 100 mass % of said main components.

By further including cobalt oxide as a subcomponent, a dielectric ceramic composition according to the present invention can be greatly improved in resistance to reduction. By making the dielectric ceramic composition have resistance to reduction, it is possible to use inexpensive base metal, e.g. Cu, as an electrode material. Therefore, it enables to reduce the cost of manufacturing a product to which the dielectric ceramic composition is mounted.

As an element according to the present invention used for an electronic component, although not particularly limited, there may be exemplified an antenna element for a communication device, an element for various filters such as a bandpass filter, etc.

According to the present invention, by making a dielectric ceramic composition comprising forsterite and calciumtitanate as main components include a specific content of aluminum oxide, it is possible to achieve a balance between competing properties for low permittivity and good frequency-temperature coefficient $\tau f$. It is also possible to improve mechanical strength of the dielectric ceramic composition, resulting in good handling ability at mounting. Therefore, a high-performance communication device, etc., wherein an antenna element or a filter element according to the present invention is mounted, can be easily manufactured.

Further, by including cobalt oxide, resistance to reduction of the dielectric ceramic composition can be improved. Therefore, it is possible to change an electrode material from relatively expensive but conventionally-used Ag to base metal (e.g. Cu) which is necessary to be baked in a reducing atmosphere but relatively inexpensive. As a result, production cost can be reduced.

BRIEF DESCRIPTION OF THE DRAWINGS

Hereinafter, the present invention will be described based on embodiments shown in drawings.

DESCRIPTION OF THE PREFERRED EMBODIMENTS

Dielectric Ceramic Composition

Figure 1:
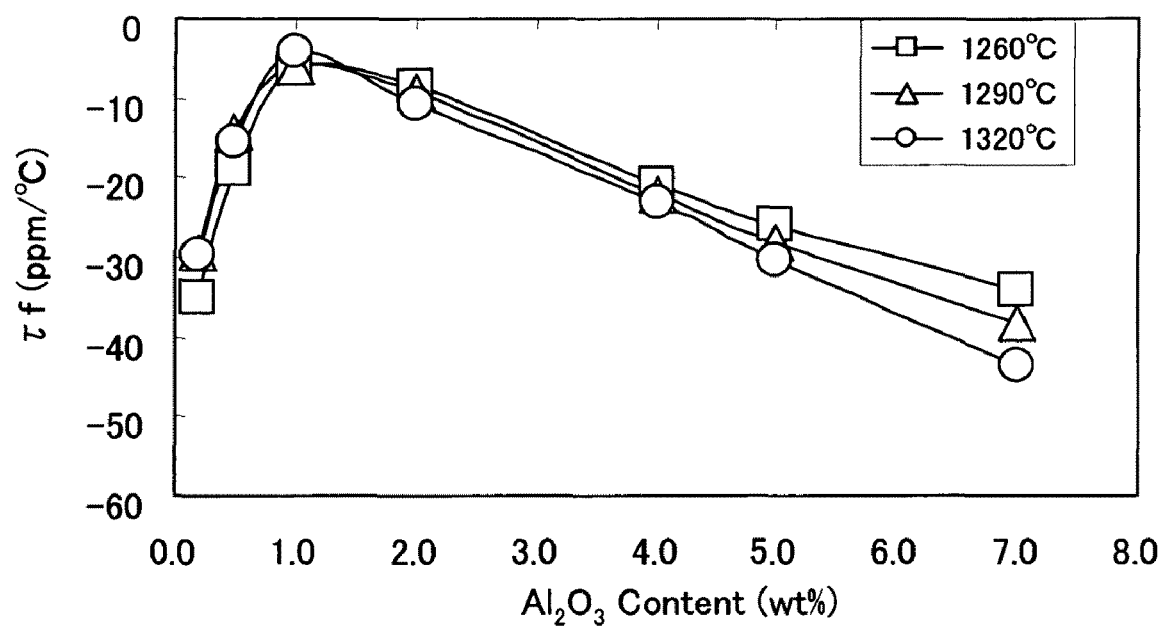
FIG. 1 is a graph showing a relationship between a content of $Al_2O_3$ and frequency-temperature coefficient $\tau f$.

A dielectric ceramic composition of the present invention comprises forsterite ($2MgO \cdot SiO_2$) and calciumtitanate ($CaTiO_3$) as main components, and aluminum oxide ($Al_2O_3$) as a subcomponent.

Forsterite is included as a main component in a rate of 93.0 to 99.0 mol %, preferably 94.0 to 99.0 mol % and more preferably 96.0 to 98.0 mol %, when calculating in terms of $2MgO \cdot SiO_2$.

Also, calcium titanate is included as a main component in a rate of 1.0 to 7.0 mol %, preferably 1.0 to 6.0 mol % and more preferably 2.0 to 4.0 mol %, when calculating in terms of $CaTiO_3$.

When a content of forsterite as a main component is too small (a content of calcium titanate is too large), specific permittivity of the dielectric ceramic composition tends to increase. Specifically, according to a dielectric ceramic composition of the present embodiment, specific permittivity can be preferably 10 or less, more preferably 8 or less. In the high-frequency region such as microwave, too large specific permittivity may cause delay in signals, resulting in difficulty in high-speed communication, or too much reduction in circuit wherein the dielectric ceramic composition is built in.

On the other hand, when a content of forsterite as a main component is too large (a content of calcium titanate is too small), there may be a tendency of insufficient sintering.

Also, in the present invention, by including a specific amount of aluminum oxide as a subcomponent, frequency-temperature coefficient τf is improved while improving strength (three-point bend) of the dielectric ceramic composition as well.

τf indicates a change rate of resonance frequency "fr" based on temperature change. By lowering this value, communication frequency can become more accurate and stable to achieve segmentation thereof. Specifically, according to a dielectric ceramic composition of the present embodiment, τf can be preferably within ±30 ppm/° C., more preferably within ±20 ppm/° C. and further preferably within ±10 ppm/° C.

Also, the strength indicates mechanical strength of a dielectric ceramic composition, and provides an indication of handling ability required when mounting into a device as an antenna element or an element for bandpass filter of a mobile phone, for example. Specifically, according to a dielectric ceramic composition of the present embodiment, strength (three-point bend) as a sintering body can be preferably 100 MPa or more, more preferably 110 MPa or more and further preferably 120 MPa or more.

Aluminum oxide is included in an amount of 0.2 to 5 mass %, preferably 0.5 to 4.0 mass % and more preferably 1.0 to 2.0 mass % when calculating in terms of $Al_2O_3$ per 100 mass % of the above main components. Too large content may cause insufficient effect to improve frequency-temperature coefficient τf; and too small content may cause insufficient effects to improve frequency-temperature coefficient τf and to improve strength.

Preferably, a dielectric ceramic composition according to the present embodiment further includes cobalt oxide (e.g. CoO and $Co_3O_4$) as a subcomponent. By including a specific amount of cobalt oxide, the dielectric ceramic composition according to the present embodiment can be greatly improved in resistance to reduction. When resistance to reduction is insufficient, Ag, capable of being fired in air but relatively expensive, may be an only choice to use as an electrode material to form on the dielectric ceramic composition. Since improved resistance to reduction allows firing in a reducing atmosphere, base metal such as Cu, which is oxidized when firing in air but is relatively inexpensive, can be used as an electrode.

Cobalt oxide is included in an amount of 0.1 to 1.2 mass %, preferably 0.1 to 0.9 mass % and more preferably 0.2 to 0.9 mass % when calculating in terms of $Co_3O_4$ per 100 mass % of the above main component. When the content is too large, the effect to improve resistance to reduction may be insufficient and Qf value and τf may be deteriorated. When the content is too small, the effect to improve resistance to reduction may be insufficient. Note that the cobalt oxide is not limited to $Co_3O_4$ and may include CoO, etc.

Note that according to the dielectric ceramic composition of the present embodiment, Qf value can be preferably 20000 GHz or more, more preferably 40000 GHz or more and further preferably 50000 GHZ or more.

Also, an average crystal grain size of crystal grains of a sintered dielectric ceramic composition is preferably 2.0 to 5.0 μm, more preferably 3.0 to 5.0 μm. Note that in the present invention, by including aluminum oxide, variation in size of crystal grains is reduced. As a result, mechanical strength of the dielectric ceramic composition can be improved.

The average crystal grain size of crystal grains can be obtained, for example, by performing SEM observation of intact surface of the dielectric ceramic composition, or by cutting the dielectric ceramic composition and thermal etching or chemical etching after mirror polishing to perform SEM observation of the etched surface; and then measuring crystal grain sizes of the predetermined number of crystal grains to calculate the average based on the measurements. Note that crystal grain size of each crystal grain can be obtained, for example, by a code method in which each crystal grain is assumed to be spherical. Also, when calculating the average crystal grain size, the number of particles subject to measuring the crystal grain size is normally 100 or more.

Production Method of Dielectric Ceramic Composition

Hereinafter, a production method of a dielectric ceramic composition of the present embodiment will be specifically described.

First, main component materials and subcomponent materials constituting a dielectric ceramic composition material are prepared.

In the present embodiment, forsterite material as the main component material can be obtained by so-called solid phase method. First, magnesium oxide and silicon oxide, or materials to become these oxides after firing are prepared. As a compound to become an oxide after firing, there may be mentioned, for example, carbonate, halide, oxalate, nitrate, hydroxide, organic metallic compound, etc.

Next, the above materials are weighed so that a mole ratio of Mg element and Si element is 2:1, and mixed to prepare mixed powder. As a method to mix each material, it is preferable to add water or organic solvent to the material powder and to wet-mix it by ball mill, etc.

Then, the above-obtained mixed powder is subject to calcination for solid-phase reaction to prepare calcined powder. At calcination, sintering agent may be added to lower the firing temperature at the level of not disturbing the effects of the present invention. As a specifics intering agent, $SrCO_3$, $BaCO_3$, $CaCO_3$, $SiO_2$, NiO, etc., is preferable, and the amount is preferably 0.1 to 0.5 mass % per 100 mass % of the whole mixed powder. As conditions for calcination, holding temperature is preferably 1000 to 1200° C. and temperature holding time is preferably 2 to 5 hours. The calcination may be performed in air; in an atmosphere with higher oxygen partial pressure than in air; or in a pure oxygen atmosphere.

The obtained calcined powder is pulverized to prepare the forsterite material with an average particle size of 2.0 to 2.5 µm. A pulverizing method is not particularly limited, and for example, pulverization can be performed by adding water or organic solvent to the powder and wet-mixing it by ball mill, etc.

In the present embodiment, calcium titanate material as the main component material can be obtained as with the forsterite material. That is, first, calcium oxide and titanium oxide, or materials to become these oxides after firing are prepared. Next, the above materials are weighed so that a mole ratio of Ca element and Ti element is 1:1, and mixed to prepare mixed powder.

The above-obtained mixed powder is subject to calcination for solid-phase reaction to prepare calcined powder. At the calcination, sintering agent may be added to lower the firing temperature at the level of not disturbing the effects of the present invention. As a specific sintering agent, $MnCO_3$, $SiO_2$, $BaCO_3$, $SrCO_3$, NiO, etc., is preferable, and the amount is same as in the case of the forsterite material. Conditions for calcination may be different from those of preparing the forsterite material, but is preferable to be same. By applying same conditions, the forsterite material and the calcium titanate material can be calcined simultaneously, resulting in efficient production of the dielectric ceramic composition of the present invention. Then, the obtained calcined powder is pulverized to prepare the calcium titanate material with an average particle size of 2.7 to 3.3 µm.

To the above-obtained forsterite material and calcium titanate material (main component materials), aluminum oxide or a material to become aluminum oxide after firing is weighed and added as a subcomponent material. Further, cobalt oxide or a material to become cobalt oxide after firing is preferably added as a subcomponent material. Specifically, as a material of cobalt oxide, CoO may be used, or carbonate, i.e. $CoCO_3$, may be used. The average particle size of the added subcomponents is preferably 0.5 to 2.0 µm.

The above powder obtained by adding the subcomponent materials to the main component materials is mixed to prepare mixed powder. A mixing method is not particularly limited, and mixing may be performed, for example, by dry-mixing, or by adding water or organic solvent to the mixed powder to wet-dry it by using ball mill, etc.

Then, the prepared mixed powder is granulated. Granulation is performed to make the mixed powder be agglomerated particles with an appropriate size suited for forming. As a granulating method, for example, a press granulation method, a spray dry method, etc., may be mentioned. The spray dry method is to add a normally-used binder such as polyvinyl alcohol to the mixed powder and then to atomize it in a spray dryer to dry. The average particle size of the mixed powder (dielectric ceramic composition material) as granules is preferably 100 to 300 µm.

Then, the obtained granules are formed in a predetermined shape to obtain a formed green body before firing. As a method to form the granules, for example, dry forming, wet forming, extrusion molding, etc., may be mentioned. The dry forming is a forming method of filling granules in a mold and compressing with pressure (pressing). When forming by the dry forming, the applied pressure is preferably 100 to 300 MPa. Note that the shape of the formed green body is not particularly limited and may be properly determined depending on application.

Next, the formed green body is fired to obtain a dielectric ceramic composition of the present embodiment as a sintered body. In the present embodiment, preferably, the firing conditions include temperature rising rate: 150 to 250° C./hr; holding temperature: 1260 to 1320° C.; holding time: approximately 1.5 to 4.0 hours; firing atmosphere: in air. When holding temperature is too low, sintering may be insufficient and desired properties tend to be hardly obtained. When holding temperature is too high, the formed green body tends to react with a structure (ceramic setter plate) used for firing.

Thus obtained dielectric ceramic composition is processed into a predetermined shape depending on application, and Cu electrode is formed in a reducing atmosphere with preferably 700 to 850° C., so that an antenna element or filter element is obtained. Then, it is mounted on a printed board, etc., by soldering, etc., for use in a variety of electronic devices, etc.

Note that the present invention is not limited to the above-described embodiments and variously modified within the scope of the present invention.

For example, in the above-described embodiment, after forsterite and calciumtitanate are preliminarily synthesized, main component materials of a dielectric ceramic composition is obtained. However, main component materials maybe obtained by initially mixing all materials to constitute forsterite and calcium titanate.

EXAMPLES

Hereinafter, the present invention will be explained based on further specific examples, but the present invention is not limited to the examples.

Example 1

First, as materials for forsterite ($2MgO.SiO_2$), $MgCO_3$ and $SiO_2$ were prepared. The $MgCO_3$ and. $SiO_2$ were weighed to have a mole ratio of 2:1, added with $SrCO_3$ and $MnCO_3$ in a total amount of 0.8 mass %, wet mixed for 6 hours by ball mill and dried. The dried powder was calcined under conditions of 1000 to 1200° C. and 2 to 5 hours. The calcined powder was wet pulverized by ball mill and dried to obtain forsterite material powder with an average particle size of 2.0 to 2.5 µm.

Next, as materials for calcium titanate ($CaTiO_3$), $CaCO_3$ and $TiO_2$ were prepared. The $CaCO_3$ and $TiO_2$ were weighed to have a mole ratio of 1:1, added with $MnCO_3$ and $SiO_2$ in a total amount of 1.0 mass %, wet mixed for 6 hours by ball mill and dried. The dried powder was calcined under conditions of 1000 to 1200° C. and 2 to 5 hours. The calcined powder was wet pulverized by ball mill and dried to obtain calcium titanate material powder with an average particle size of 2.7 to 3.3 μm.

The obtained forsterite and calcium titanate, and $Al_2O_3$ as a subcomponent were weighed and blended to have mole ratios after sintering as shown in Table 1, and wet mixed for 6 hours by ball mill. After wet-mixing, the obtained slurry was dried to obtain a dielectric ceramic composition material. Next, this dielectric ceramic composition material was added with polyvinyl alcohol as an organic binder, granulated, and then, press-formed to obtain a discoid green body with a diameter of 12.5 mm and a thickness of 6.5 mm. The green body was fired in air under conditions of 1260, 1290, 1320° C.-2h to obtain a sintered body. Note that the average particle size of the granules was 200 μm.

Specific Permittivity ∈r

The sintered body was processed in a cylindroid shape with a diameter of 10.0 mm and a height of 5.0 mm. Specific permittivity (no unit) was calculated by using Network Analyzer 8510B, Synthesized Sweeper 8341B and Parameter Test Set 8516A (any of which are a product of Hewlett-Packard Co.) as a measuring instrument by means of a post-resonator method (Hakki Coleman Process). As a criterion for evaluation, measurements of 8.5 or below were defined as being good. The results are shown in Table 1.

Qf Value

Q value was calculated under same measuring conditions as those of specific permittivity, and multiplied by resonance frequency "fr" to obtain Qf value. Higher Qf value is more preferable. As a criterion for evaluation, measurements of 20000 GHz or higher were defined as being good. The results are shown in Table 1.

τf Value (Frequency-Temperature Coefficient)

For obtaining τf value by a post-resonator method (Hakki Coleman Process), each sample was set in a constant-temperature bath at −40° C., 20° C. and 80° C. respectively to measure resonance frequency "fr". The obtained values were assigned to the following formula to calculate τf value: $[(Fr^{80°C.} - Fr^{-40°C.})/Fr^{20°C.}]/120 \times 1E^6$ (ppm/° C.). τf value closer to 0 is more preferable. As a criterion for evaluation, measurements within ±30 ppm/° C. were defined as being good. The results are shown in Table 1.

Table 1 shows that too small amount of forsterite of the main components results in good τf value but inferior specific permittivity compared to the other samples. It can be also confirmed that too small amount of calcium titanate of the main components results in good specific permittivity but inferior τf value compared to the other samples. Note that Sample 8 was not sintered even at 1320° C., and failed to be evaluated on the properties. The above results indicate that specific permittivity and τf value show contradictory tendencies.

Example 2

Except for weighing and blending $Al_2O_3$ as a subcomponent with content ratios to the main component materials as shown in Table 2 while using main components with same compositions as Sample 6, a dielectric ceramic composition material was produced as in Example 1. Using the produced dielectric ceramic composition material, a dielectric ceramic composition was produced and evaluated as in Example 1. The results are shown in Table 2.

Also, the produced dielectric ceramic composition material was added with polyvinyl alcohol as an organic binder, granulated and then press-formed at 2.0 tonf/cm² to obtain a formed green body with dimensions of 20×5.5×1 mm. The green body was fired in air under conditions of 1290° C.-2h to obtain a sintered body. For sintered body, strength (three-point bend) was measured by the following method.

Strength

From the obtained sintered body, a specimen with dimensions of 16.0×4.5×0.8 mm was produced, and a three-point bending test was performed at a pitch of 15 mm and a crosshead speed of 0.5 mm/min. The results are shown in Table 2. Eight specimens were produced for each sample to calculate the average. As a criterion for evaluation, the average values of 100 MPa or more were defined as being good.

TABLE 1

| | | | Sample No. | | | | | | | |
|---|---|---|---|---|---|---|---|---|---|---|
| | | | *1 | 2 | 3 | 4 | 5 | 6 | 7 | *8 |
| Component | Main Component (mol %) | 2MgO•SiO₂ | 92.0 | 93.0 | 94.0 | 96.0 | 97.0 | 98.0 | 99.0 | 99.5 |
| | | CaTiO₃ | 8.0 | 7.0 | 6.0 | 4.0 | 3.0 | 2.0 | 1.0 | 0.5 |
| | Subcomponent (wt %) | Al₂O₃ | 2.00 | | | | | | | |
| Firing Temp. 1260° C. | Specific Permittivity ∈r | | 8.75 | 8.49 | 8.2 | 7.79 | 7.72 | 7.56 | 7.42 | — |
| | Qf (GHz) | | 63,245 | 62,345 | 60,122 | 59,762 | 56,752 | 49,393 | 38,459 | — |
| | Frequency-Temperature Coefficient τf (ppm/° C.) | | −5.0 | −6.1 | −6.9 | −7.3 | −7.5 | −8.4 | −18.0 | — |
| Firing Temp. 1290° C. | Specific Permittivity ∈r | | 8.91 | 8.45 | 8.17 | 7.83 | 7.70 | 7.61 | 7.45 | — |
| | Qf (GHz) | | 65,498 | 64,727 | 62,891 | 60,024 | 54,325 | 47,373 | 39,674 | — |
| | Frequency-Temperature Coefficient τf (ppm/° C.) | | −4.1 | −5.2 | −6.1 | −7.0 | −7.8 | −9.0 | −12.8 | — |
| Firing Temp. 1320° C. | Specific Permittivity ∈r | | 8.99 | 8.55 | 8.31 | 7.89 | 7.68 | 7.53 | 7.50 | — |
| | Qf (GHz) | | 67,893 | 66,239 | 66,281 | 64,521 | 55,238 | 47,620 | 44,345 | — |
| | Frequency-Temperature Coefficient τf (ppm/° C.) | | −2.6 | −4.0 | −4.1 | −5.3 | −6.0 | −10.7 | −12.0 | — |

*indicates a comparative example of the present invention.

TABLE 2

| | | | \*9 | 10 | 11 | 12 | 6 | 13 | 14 | \*15 |
|---|---|---|---|---|---|---|---|---|---|---|
| Component | Main Component (mol %) | 2MgO•SiO$_2$ | | | | | 98.0 | | | |
| | | CaTiO$_3$ | | | | | 2.0 | | | |
| | Sub-component (wt %) | Al$_2$O$_3$ | 0.00 | 0.20 | 0.50 | 1.00 | 2.00 | 4.00 | 5.00 | 7.00 |
| Firing Temp. 1260° C. | Specific Permittivity εr | | 7.00 | 7.11 | 7.29 | 7.46 | 7.56 | 7.50 | 7.44 | 7.20 |
| | Qf (GHz) | | 60,602 | 56,530 | 54,321 | 51,582 | 49,393 | 30,459 | 28,088 | 19,643 |
| | Frequency-Temperature Coefficient τf (ppm/° C.) | | −47.8 | −35.0 | −18.9 | −6.2 | −8.4 | −20.7 | −25.9 | −34.1 |
| Firing Temp. 1290° C. | Specific Permittivity εr | | 7.03 | 6.98 | 7.21 | 7.58 | 7.61 | 7.45 | 7.41 | 7.12 |
| | Qf (GHz) | | 62,334 | 59,843 | 56,239 | 50,259 | 47,373 | 30,321 | 27,750 | 16,994 |
| | Frequency-Temperature Coefficient τf (ppm/° C.) | | −39.7 | −29.4 | −14.3 | −6.0 | −9.0 | −22.0 | −28.0 | −38.2 |
| | Strength (MPa) | | 93 ± 14 | 106 ± 40 | 112 ± 23 | 115 ± 13 | 118 ± 29 | 120 ± 28 | 122 ± 33 | 123 ± 29 |
| Firing Temp. 1320° C. | Specific Permittivity εr | | 7.06 | 7.00 | 7.20 | 7.59 | 7.53 | 7.41 | 7.39 | 7.01 |
| | Qf (GHz) | | 64,136 | 61,935 | 56,056 | 51,333 | 47,620 | 32,275 | 26,877 | 15,666 |
| | Frequency-Temperature Coefficient τf (ppm/° C.) | | −39.0 | −29.7 | −15.6 | −4.2 | −10.7 | −23.0 | −30.2 | −43.6 |

\*indicates a comparative example of the present invention.

Figure 2A:
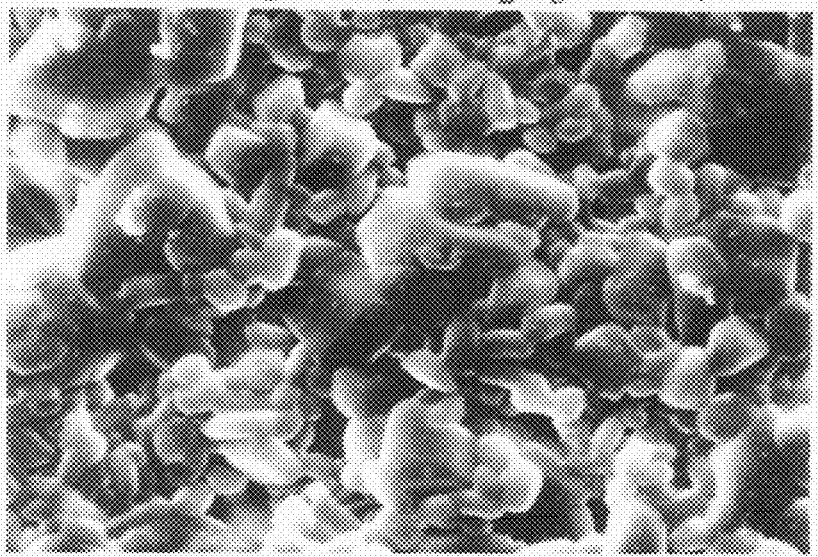
FIG. 2A is a SEM picture of a dielectric ceramic composition according to a comparative example of the present invention and FIG. 2B is a SEM picture of a dielectric ceramic composition according to an example of the present invention.
Figure 2B:
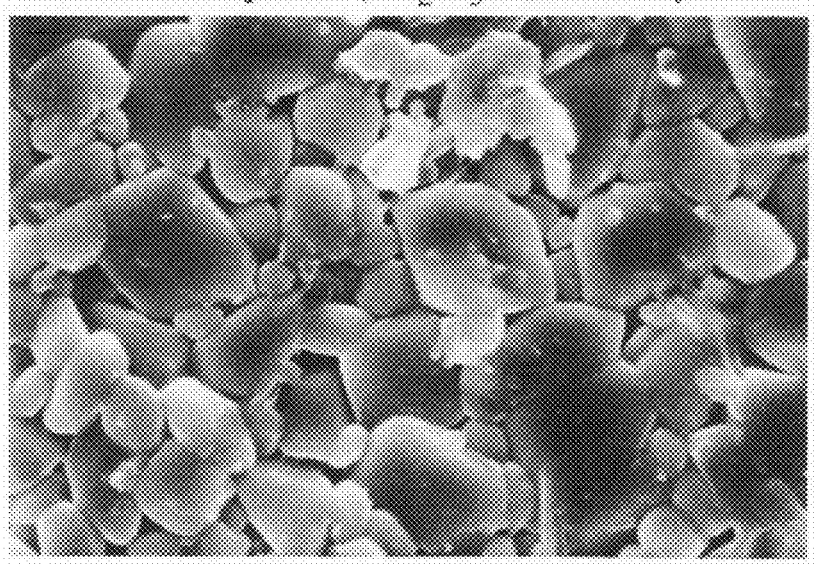

Table 2 shows changes in content of Al$_2$O$_3$ result in no particular change in specific permittivity but large changes in τf value. This can be visually recognized in FIG. 1, which shows a relationship between τf value and content of Al$_2$O$_3$. Therefore, by including Al$_2$O$_3$ in a range of the present invention, a balance between specific permittivity and τf value can be achieved. It is also confirmed that including Al$_2$O$_3$ results in improvement in strength (three-point bend). As a reason for improved strength, it is possible that including Al$_2$O$_3$ may cause to reduce variation in crystal grain sizes. FIG. 2A is a SEM picture of the intact surface after firing of Sample 9 including no Al$_2$O$_3$; and FIG. 2B is a SEM picture of the intact surface of Sample 6 including Al$_2$O$_3$. As compared FIG. 2A to FIG. 2B, it can be confirmed that variation in crystal grain sizes are more reduced in FIG. 2B.

Example 3

Except for further weighing and blending Co$_3$O$_4$ as a sub-component with content ratios shown in Table 3, using same component ratios as Sample 6, a dielectric ceramic composition was produced and evaluated as in Example 1. The results are shown in Table 3. Also, resistance to reduction of the sintered body was measured by the following method.

Resistance to Reduction

Figure 3:
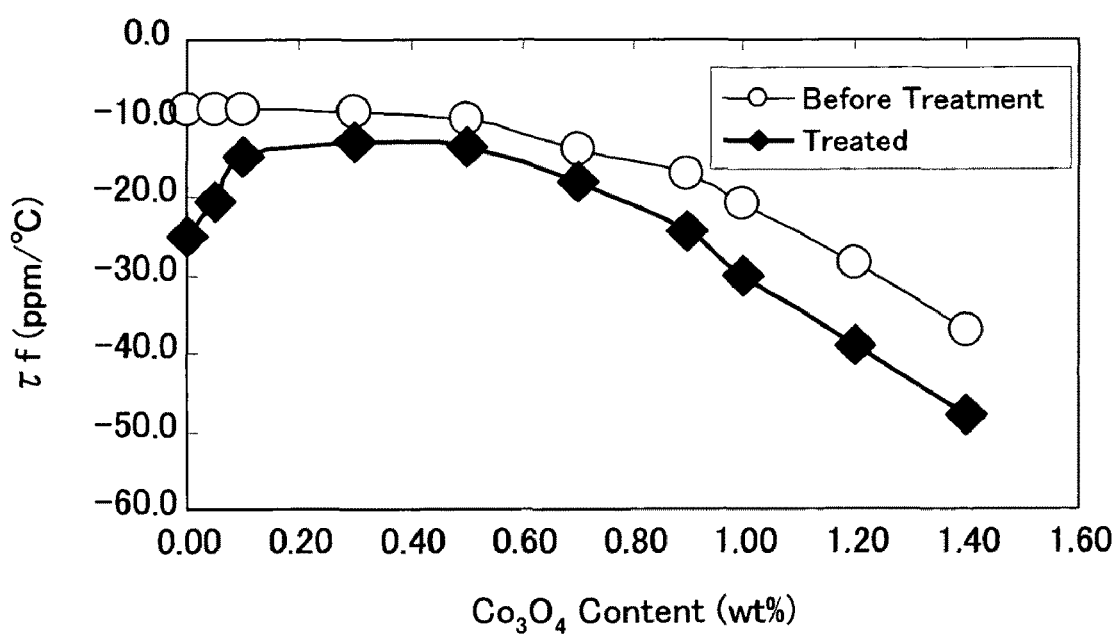
FIG. 3 is a graph showing a relationship between a content of $Co_3O_4$ and frequency-temperature coefficients τf before and after reduction treatment.

The obtained sintered body was subject to reduction treatment in a reducing atmosphere with N$_2$-100% (pO$_2$=10 ppm) under conditions of 800° C.-10 min. For samples before and after the treatment, frequency-temperature coefficient τf values were evaluated as in Example 1. Then, amount of change between τf values of samples before and after reduction treatment, and change rate were calculated. As a criterion for evaluation, the amount of change within 65% was defined as being good. The results are shown in Table 4 and FIG. 3. Note that in FIG. 3, white circle indicates τf value before reduction treatment and black rhombus indicates τf value after reduction treatment.

TABLE 3

| | | | 6 | 16 | 17 | 18 | 19 | 20 | 21 | 22 | 23 |
|---|---|---|---|---|---|---|---|---|---|---|---|
| Component | Main Component (mol %) | 2MgO•SiO$_2$ | | | | | 98.0 | | | | |
| | | CaTiO$_3$ | | | | | 2.0 | | | | |
| | Sub-component (wt %) | Al$_2$O$_3$ | | | | | 2.00 | | | | |
| | | Co$_3$O$_4$ | 0.00 | 0.05 | 0.10 | 0.30 | 0.80 | 1.00 | 1.20 | 1.40 | 1.50 |
| Firing Temp. 1260° C. | Specific Permittivity εr | | 7.56 | 7.57 | 7.59 | 7.67 | 7.87 | 7.86 | 7.81 | 7.73 | 7.71 |
| | Qf (GHz) | | 49,393 | 49,456 | 48,122 | 45,954 | 39,993 | 37,031 | 34,589 | 27,659 | 20,678 |
| | Frequency-Temperature Coefficient τf (ppm/° C.) | | −8.4 | −8.4 | −8.0 | −8.1 | −9.0 | −11.4 | −12.3 | −18.6 | −24.3 |
| Firing Temp. 1290° C. | Specific Permittivity εr | | 7.61 | 7.61 | 7.61 | 7.69 | 7.82 | 7.80 | 7.74 | 7.59 | 7.52 |
| | Qf (GHz) | | 47,373 | 47,321 | 46,843 | 43,567 | 37,327 | 35,019 | 32,456 | 22,986 | 15,980 |
| | Frequency-Temperature Coefficient τf (ppm/° C.) | | −9.0 | −9.0 | −9.2 | −10.1 | −14.0 | −16.2 | −17.2 | −24.5 | −28.6 |
| Firing Temp. 1320° C. | Specific Permittivity εr | | 7.53 | 7.53 | 7.50 | 7.73 | 7.75 | 7.70 | 7.62 | 7.41 | 7.23 |
| | Qf (GHz) | | 47,620 | 47,329 | 45,268 | 40,003 | 35,973 | 31,082 | 26,539 | 17,843 | 12,489 |
| | Frequency-Temperature Coefficient τf (ppm/° C.) | | −10.7 | −10.8 | −11.0 | −12.9 | −15.1 | −17.4 | −21.0 | −27.9 | −32.3 |

TABLE 4

| | | | \multicolumn{10}{c}{Sample No.} | | | | | | | | | |
|---|---|---|---|---|---|---|---|---|---|---|---|---|
| | | | 6 | 16 | 17 | 18 | 24 | 25 | 26 | 20 | 21 | 22 |
| Component | Main Component (mol %) | $2MgO \cdot SiO_2$ | | | | | 98.0 | | | | | |
| | | $CaTiO_3$ | | | | | 2.0 | | | | | |
| | Subcomponent (wt %) | $Al_2O_3$ | | | | | 2.00 | | | | | |
| | | $Co_3O_4$ | 0.00 | 0.05 | 0.10 | 0.30 | 30.50 | 0.70 | 0.90 | 1.00 | 1.20 | 1.40 |
| Firing Temp. 1290° C. | Frequency-Temperature Coefficient τf (ppm/° C.) | Before Reduction Treatment | −8.9 | −8.8 | −9.0 | −9.2 | −10.1 | −14.0 | −17.2 | −21.0 | −28.6 | −37.0 |
| | | After Reduction Treatment | −25.0 | −20.5 | −15.0 | −13.0 | −13.6 | −18.2 | −24.5 | −30.1 | −39.0 | −48.0 |
| | | Amount of Change Before/After Treatment | 16.1 | 11.7 | 6.0 | 3.8 | 3.5 | 4.2 | 7.3 | 9.1 | 10.4 | 11.0 |
| | | Change Rate (%) Before/After Treatment | 100.0 | 72.7 | 37.3 | 23.6 | 21.7 | 26.1 | 45.3 | 56.5 | 64.6 | 68.3 |

From Table 3, it can be confirmed that including $Co_3O_4$ does not relatively affect properties. Also, from Table 4, by including $Co_3O_4$ in a preferable range of the present invention, deterioration in τf value after reduction treatment can be reduced. Therefore, relatively inexpensive base metal such as Cu can be applied as an electrode material, resulting in reduction in production cost of a product.

What is claimed is:

1. A dielectric ceramic composition comprising:
   as main components, forsterite in an amount of 93.0 to 99.0 mol % when calculating in terms of $2MgO.SiO_2$ and calcium titanate in an amount of 1.0 to 7.0 mol % when calculating in terms of $CaTiO_3$ and
   as a subcomponent, aluminum oxide in an amount of 0.2 to 5 mass % when calculating in terms of $Al_2O_3$ per 100 mass % of said main components.

2. The dielectric ceramic composition as set forth in claim 1 further comprising cobalt oxide as a subcomponent in an amount of 0.1 to 1.2 mass % when calculating in terms of $Co_3O_4$ per 100 mass % of said main components.

3. An antenna element having a dielectric layer comprised of the dielectric ceramic composition as set forth in claim 1.

4. A filter element having a dielectric layer comprised of the dielectric ceramic composition as set forth in claim 1.

5. An antenna element having a dielectric layer comprised of the dielectric ceramic composition as set forth in claim 2.

6. A filter element having a dielectric layer comprised of the dielectric ceramic composition as set forth in claim 2.

* * * * *